April 25, 1950 P. B. SAGAR 2,505,432
CONTROL APPARATUS FOR FLUID FUEL BURNERS
Filed Nov. 18, 1947
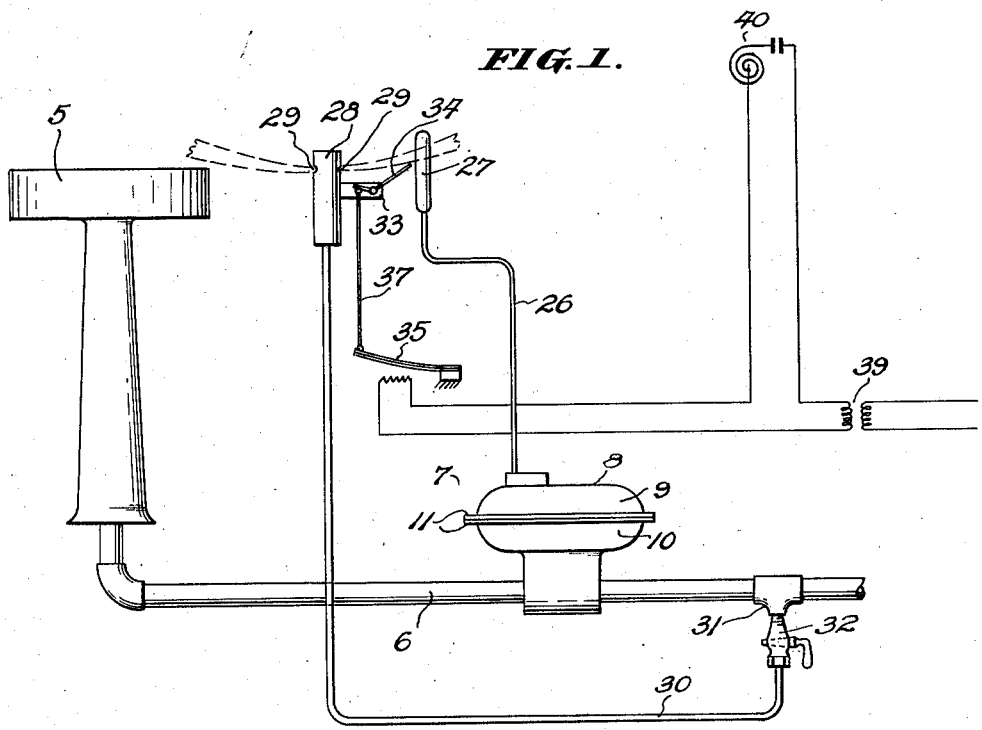
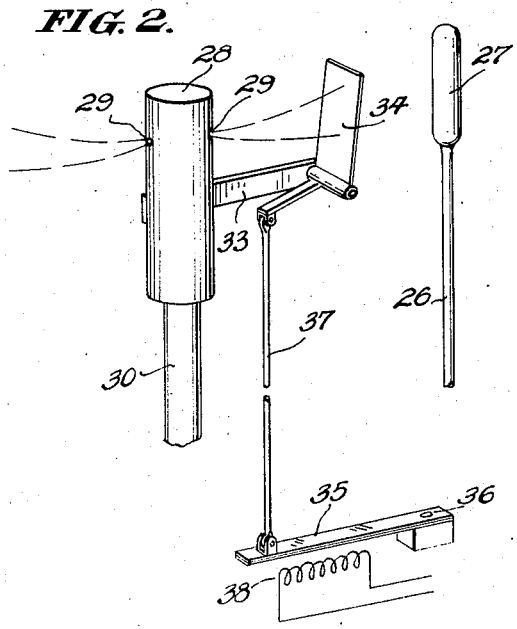
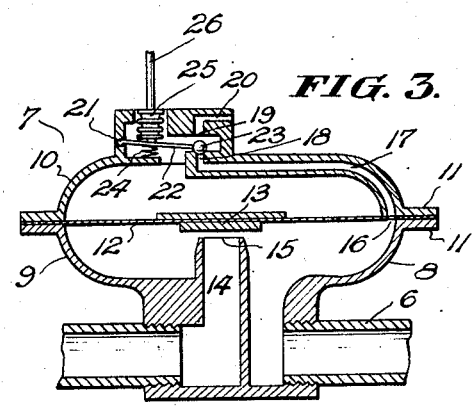
Inventor
Paul B. Sagar
W. S. McDowell
Attorney Patented Apr. 25, 1950

2,505,432

UNITED STATES PATENT OFFICE 2,505,432

CONTROL APPARATUS FOR FLUID FUEL BURNERS

Paul B. Sagar, Cleveland, Ohio

Application November 18, 1947, Serial No. 786,588

6 Claims. (Cl. 236—68)

1

The present invention relates to fluid fuel burning heating systems, and has particular reference to apparatus used in conjunction with such systems for automatically controlling the flow of fuel to a main fuel burner in accordance with the temperature requirements of a home, factory, or other building or object to which heat is supplied by the heating system.

In the past, many so called automatic or thermostatically controlled systems have been proposed for use, or actually used, in conjunction with fluid fuel burning systems for controlling the flow of fuel to the main fuel burner or burners, in accordance with the requirement for heat of the object or space which is to be heated by such system. In general, such systems usually comprise a main flow-regulating valve which is interposed within a fuel supply conduit associated with the main fuel burner, and which is operable to open or close the associated supply conduit to furnish fuel for the burner. The operation of such valves is usually controlled by electrically actuated means, such as an electrical motor or solenoid, acting in response to a thermostatic switch or similar thermally responsive apparatus located in the region of heat transfer or distribution. It will be manifest, that the use of such electrical motors or solenoids greatly adds to the complexity of the valve system, and requires a relatively large amount of electrical current for operation thereby entailing excessive expense in the operation of the fuel burning system.

It is therefore, an object of the present invention to provide thermostatically controlled apparatus which functions independently of electric motor or solenoid means to control the operation of a main fuel supply valve of a fluid fuel burning system.

It is another object of this invention to provide an inexpensive, safe and efficient control system for fluid fuel burning apparatus of the type employing a fuel flow-regulating valve and a so-called constant burning pilot burner, wherein said system is precluded from opening the associated flow-regulating valve in the absence of heat created by the flame of the associated pilot burner.

It is still a further object of this invention to provide an improved control system for fluid fuel burners of the character described, which comprises a charged bulb system for controlling the operation of an associated flow-regulating valve, which bulb system is normally positioned in the path of a flame issuing from an associated pilot burner, and upon receipt of heat from such flame functions to open the associated flow-regulating valve to supply fuel for the main burner, and which functions in the absence of heat of a pilot burner flame to close the associated flow-regulating valve; and wherein electrically actuated thermostatically controlled means are provided for shielding the associated charged bulb system from the influence of heat emanating from the pilot burner flame, whereby to close the associated flow-regulating valve independently of electric motor or solenoid means.

For a further and more complete understanding of the present invention and the additional objects and advantages thereof, reference is made to the following description and the appended drawing wherein:

Fig. 1 is a diagrammatic view of a gaseous fuel burning system incorporating the present improved control apparatus;

Fig. 2 is a perspective view of a pilot burner, incorporating flame-deflecting apparatus and a temperature responsive fluid-charged bulb of the type used in the present invention;

Fig. 3 is a medial vertical sectional view taken through a gaseous fuel flow-regulating valve of a type employed by the present invention.

Referring now to the drawing, the numeral 5 designates a main fuel burner of any suitable type, to which fuel is supplied by way of a fuel supply conduit 6. Interposed within the fuel supply conduit 6 is a suitable flow-regulating valve 7 which, in the present instance, is illustrated in detail in Fig. 3 as a diaphragm type valve for regulating the flow of gaseous fuel to the main burner 5. In general, the valve 7 comprises a sectional outer casing 8 composed of a pair of hemispherical sections 9 and 10 formed with outward and circular mating flanges 11 between which is held a flexible diaphragm 12 formed from any suitable gas impervious material, and provided at its central portion with a weighted valve disk 13. Disposed below the valve 13, and formed integral with the lower casing section 9, is an outlet passageway 14 whose upper end provides a valve seat 15 for the reception of the valve 13. The passageway is disposed in a substantially central position within the lower section 9 and is enclosed from the remaining area of the section, in order that gas present within the lower section may only pass through the passage 14 upon the opening of the valve 13. Also communicating with the chamber provided by the lower casing section 9 is the end of the fuel supply conduit 6, whereby gaseous fuel may freely flow within the lower section. The flexible diaphragm 12 is provided toward its outer edge with a slotted passageway 16 through which gases contained within the lower section may pass upwardly into the upper section 10. Disposed in registration with the channel 16 of the diaphragm is a pressure equalizing channel 17 formed integral with the upper casing section 10. The channel 17 terminates within the upper valve section in a valve seat 18, and disposed in vertical spaced alignment with the valve seat 18 is a similar valve seat 19 formed at the inner end of a vent opening 20. Pivotally mounted within the upper portion of the section 10, as at 21, is an arm 22 which carries at its outer end a ball valve 23 in vertical alignment with the respective valve seats 18 and 19. Cooperative with the arm 22 is a coil spring 24 which serves to normally urge the arm and its associated ball valve 23 in an upward direction to close the vent opening 20. Also cooperating with the valve arm 22, and opposed to the spring 24, is an expansible bellows 25 which is sealed within the upper section, and which communicates with, and is connected to, the lower end of a capillary tube 26 whose upper end communicates with a closed gas-charged bulb 27. In this manner, as gas within the bulb is caused to expand in response to a marked temperature increase, the bellows 25 will likewise be expanded longitudinally to force the valve arm 22 downwardly to cause the valve 23 to close the pressure equalizing channel 17. In operation, with the ball valve 23 closing the pressure equalizing channel 17, as shown particularly in Fig. 3, gaseous fuel entering the lower chamber under pressure by way of the conduit 6 will exert its pressure upon the under side of the diaphragm 12 and cause the same to rise carrying with it associated valve 13, thereby opening the outlet passageway 14 to allow the gas to pass outwardly of the valve and to the main burner 5. Conversely, when the ball valve 23 closes the vent opening 20, gas entering the lower section of the valve will be free to pass by way of the pressure equalization channel 17 into the upper section of the valve whereby pressures on either side of the flexible diaphragm will be equal, thereby allowing the weighted valve 13 to close the upper end of the outlet passageway to prevent passage of gaseous fuel through the valve. It will be understood, that movement of the ball valve 23 is controlled by the flexible bellows 25, and upon expansion of the latter the ball valve 23 will be seated over the pressure equalization channel 17 thereby causing the valve to assume its open position. Conversely, as the bellows 25 contracts with a decrease in heat upon the associated bulb 27, the spring 24 will serve to raise the ball valve 23 into engagement with the vent opening thereby causing the valve to close.

The system further makes use of a suitable pilot burner 28 which is provided with a pair of opposed flame orifices 29, and which is positioned so as to direct a flame across the upper portion of the main burner 5. Fuel is supplied the pilot burner 28 by way of a relatively small supply line 30 introduced within the main supply conduit 6, as at 31, and which is provided with a manually operable shut-off valve 32.

Disposed adjacent the opposite flame orifice 29 of the pilot burner is the gas-charged bulb 27 which controls the operation of the flow-regulating valve 7. As shown particularly in Fig. 1 of the drawings, the bulb 27 is positioned relative to the pilot burner 28 so as to normally lie in the path of fuel or of a flame issuing from the pilot burner, and functions in response to the direct heat of such flame to expand its associated bellows 25 to open the main flow-regulating valve 7 and to supply fuel to the main burner 5 for ignition by the opposite or opposed flame of the pilot burner.

Mounted upon the body of the pilot burner 28, below the flame orifices 29, is an outwardly extending supporting bracket 33. Pivotally mounted upon the bracket 33 between the pilot burner 28 and the charged bulb 27 is a bell crank-like flame-diverting shield 34 which is movable into and out of the path taken by a flame emanating from the pilot burner to either prevent or permit of direct contact of the pilot burner flame with the charged bulb 27. In a substantially vertical condition, as indicated by Fig. 2 of the drawing, the shield 34 serves to divert the pilot flame upwardly away from the charged bulb 27 thereby protecting the same from the influence of heat given off by the pilot flame. Conversely, when occupying a substantially horizontal position, the shield 34 allows the pilot burner flame to play directly upon the bulb thereby heating the same expanding the gas within the system, and subsequently causing the bellows 25 to expand to open the flow-regulating valve 7.

The movement of the shield 34 is controlled by the deflection of a bimetallic arm 35 which is remotely positioned with respect to the pilot burner flame, and which has one of its ends rigidly secured, as at 36, with its opposite end free to deflect in accordance with the temperature changes within the atmosphere surrounding the arm. The shield 34 is linked, by way of its shorter bell crank arm, to a connecting rod or shaft 37 which, in turn, is rigidly secured at its lower end to the outer end of the bimetallic arm 35. The arm 35 is positioned so as to deflect upwardly, referring to Figs. 1 and 2, in response to heat, and thus serves to rock the bell crank shield 34 about its pivotal connection, so as to move the same outwardly of the path of a flame emanating from the pilot burner 28. In its normal position, the arm 35 assumes a substantially horizontal position, thereby causing the shield 34 to be brought into the path of the pilot burner flame to deflect the same away from the charged bulb 27.

The movement of the bimetallic arm 35 is controlled by the operation of an electrical resistance element 38, preferably positioned directly below the arm and in close proximity thereto. The electrical resistance element 38 is furnished current by any suitable source, such as a transformer 39, with its energization being controlled by a remotely positioned thermostatic switch 40, it being understood that the thermostatic switch 40 may advantageously be positioned in a room or other region of heat distribution, whereby the heat from the main burner 5 may be controlled in accordance with the requirements for heat within such room.

In operation, with the thermostatic switch 40 in an open position, the associated electrical resistance coil or element 38 will remain de-energized, thus allowing the bimetallic arm 35 to maintain its cold or horizontal position, and to hold the shield 34 in the path of the pilot burner flame to protect the charged bulb 27 from a relatively high degree of heat. In this condition, the main flow-regulating valve 7 will be closed so as to preclude the passage of fuel to the main burner 5. As heat is required within the region of heat distribution, the thermostatic switch 40 will close the operating circuit of the electrical resistance element 38 thereby causing the same to heat, and in turn, heat will be transferred to the bimetallic arm 35 causing the same to deflect upwardly and to move the associated flame-diverting shield 34 out of the path of the pilot burner flame, thereby allowing the flame to directly strike the charged bulb 27, which will in turn open the main flow-regulating valve 6 to supply fuel to the main burner 5.

While a present preferred form of the invention has been disclosed in detail, it will be understood that the use of any suitable thermo-responsive element or apparatus, as a substitute for the charged bulb system is contemplated, the same being utilized to control the operation of any suitable flow-regulating valve used to control the passage of fuel to the main burner of the system. It will be further understood, that while the present invention has been described in association with a gaseous fuel system, the same may be utilized with equal facility in conjunction with a liquid fuel-burning system through the substitution of any suitable valve for controlling the flow of such liquid to the main fuel burner.

In view of the foregoing, it will be seen that the present invention provides a simple yet mechanically efficient control system for fluid fuel burners, wherein the operation of a main flow-regulating valve is directly controlled through thermo-responsive means operating in response to the heat of an associated pilot burner flame, with thermostatically controlled means being provided for selectively protecting the associated thermo-responsive means from the influence of the pilot burner flame. Systems formed in accordance with the present invention are characterized by their positive action, ease of operation, safety, and economy of manufacture and maintenance. Further, it will readily be seen that the present improved apparatus may be easily adapted for use with present day heating systems without extensive modification thereto.

I claim:

1. The combination with a fluid fuel burning system having a main fuel burner, a fuel flow-regulating valve, and a pilot burner for igniting fuel at the main burner, of thermo-responsive means joined with said flow-regulating valve and normally disposed in the path of a flame issuing from said pilot burner and operable in response to the heat of a flame issuing from said pilot burner to open said valve to supply fuel to said main burner, flame-diverting means disposed between said pilot burner and said thermo-responsive means and movable into and out of the path of a flame issuing from said pilot burner to prevent or permit of direct contact between such flame and said thermo-responsive means, and electrically actuated means connected with said flame-diverting means and operable in response to a remote thermostatic switch for controlling the movement of said flame-diverting means.

2. The combination with a fluid fuel burning system having a main fuel burner, a fuel flow-regulating valve for supplying fuel to the main burner, and a pilot burner for igniting fuel at the main burner, of a fluid-charged bulb including an expansible bellows connected with said flow-regulating valve, said bulb being normally disposed in the path of a flame issuing from said pilot burner and operable in response to the heat of such a flame to open said valve to supply fuel to said main fuel burner, flame-diverting means disposed between said pilot burner and said bulb and movable into and out of the path of a flame issuing from said pilot burner to prevent or permit of direct contact between such flame and said bulb, a thermally deflectible member linked with said flame-diverting means for imparting movement thereto, and an electrically-actuated thermostatically controlled heating element associated with said thermally deflectible member for supplying heat thereto.

3. The combination with a fluid fuel burning system having a main fuel burner, a fuel flow-regulating valve for supplying fuel to the main burner, and a pilot burner for igniting fuel at the main burner, of a fluid-charged bulb including an expansible bellows connected with said flow-regulating valve, said bulb being disposed in a path normally taken by a flame issuing from said pilot burner and operable in response to the heat of such a flame to open said valve to supply fuel to the main burner, a heat-insulating shield mounted between said pilot burner and said bulb for movement into and out of the path of a flame issuing from said pilot burner to shield said bulb from the heat of such flame, a thermally deflectible bimetallic arm linked with said shield for imparting movement thereto, and a thermostatically controlled electrical heating element disposed in close proximity to said bimetallic arm and operable to cause thermal deflection thereof.

4. A heating system comprising a main fluid fuel burner, a supply line for conducting fuel to said burner, a valve interposed within said supply line for controlling the flow of fuel to the burner, a pilot burner for igniting fuel at said main burner, a fluid-charged bulb including an expansible bellows linked with said valve, said bulb being disposed in a path normally taken by a flame issuing from said pilot burner and operable in response to the heat of such a flame to expand the bellows and open said valve to supply fuel to said main burner, flame-diverting means mounted between said pilot burner and said bulb for movement into and out of the path of a flame issuing from said pilot burner to prevent or permit of direct contact between such flame and said bulb, a bimetallic arm linked to said flame diverting means and operable upon thermal deflection to move said flame diverting means, an electrical heating element mounted in close proximity to said bimetallic arm for supplying heat to said arm to cause thermal deflection thereof, and a remote thermostatic switch for controlling the operation of said heating element.

5. In combination; a fluid fuel burner; a valve for controlling the passage of fuel to said burner; thermally-responsive actuating means for said valve; a constant burning-type pilot burner arranged to normally direct a flame upon said fuel burner and said thermally-responsive actuating means; a flame-deflecting member disposed between said pilot burner and said thermally-responsive actuating means and movable to a position to deflect a flame issuing from said pilot burner away from said thermally-responsive actuating means; electrically-actuated means connected with said flame-deflecting member and operable to impart movement thereto; and switch means in circuit with said electrically-actuated means for controlling the operation thereof.

6. In combination; a fluid fuel burner; a thermo-responsive valve for controlling the passage of fuel to said burner, said valve having a remotely disposed thermally sensitive element; a constant burning-type pilot burner arranged to direct a flame over said burner and upon the thermally sensitive element of said valve; a heat-insulating shield disposed between said pilot burner and the thermally sensitive element of said valve and movable to a position to shield the thermally sensitive element from a flame issuing from said pilot burner; electro-responsive means connected with said shield for imparting movement thereto; and a thermostatic switch in circuit with said electro-responsive means for controlling the operation thereof.

PAUL B. SAGAR.

REFERENCES CITED

The following references are of record in the file of this patent:

UNITED STATES PATENTS

| Number | Name | Date |
|---|---|---|
| 528,799 | Perry | Nov. 6, 1894 |
| 1,378,927 | Witham | May 24, 1921 |
| 1,756,688 | Hutchinson | Apr. 29, 1930 |
| 1,842,335 | Te Pas | Jan. 19, 1932 |
| 2,211,301 | Taylor | Aug. 13, 1940 |
| 2,270,722 | Beam | Jan. 20, 1942 |